July 24, 1951  R. BOISSONNAULT  2,561,608
LOAD COLLECTING REFUSE VEHICLE AND PACKING DEVICE THEREFOR
Filed March 24, 1950
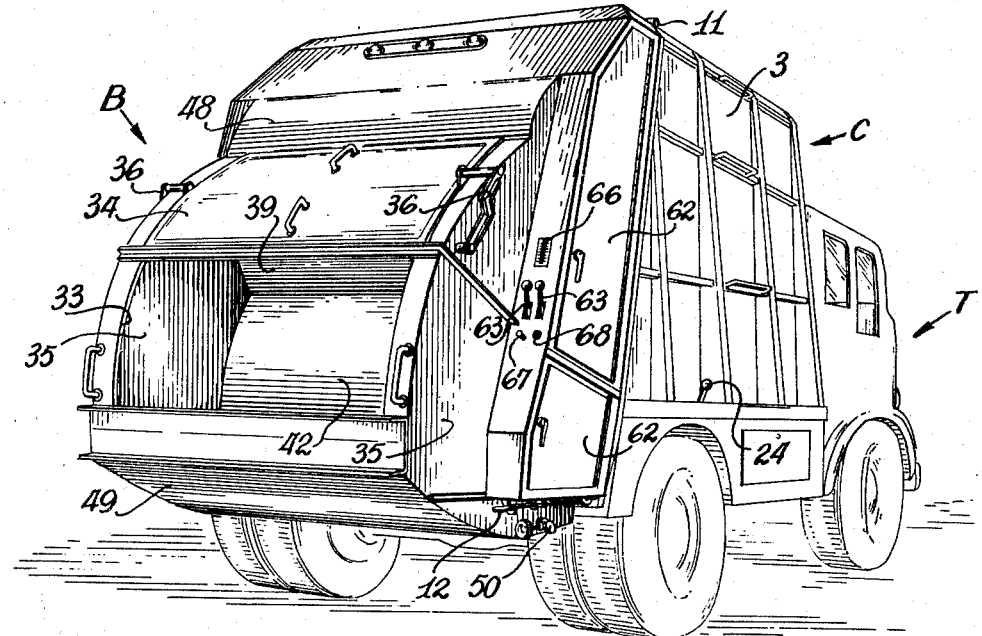
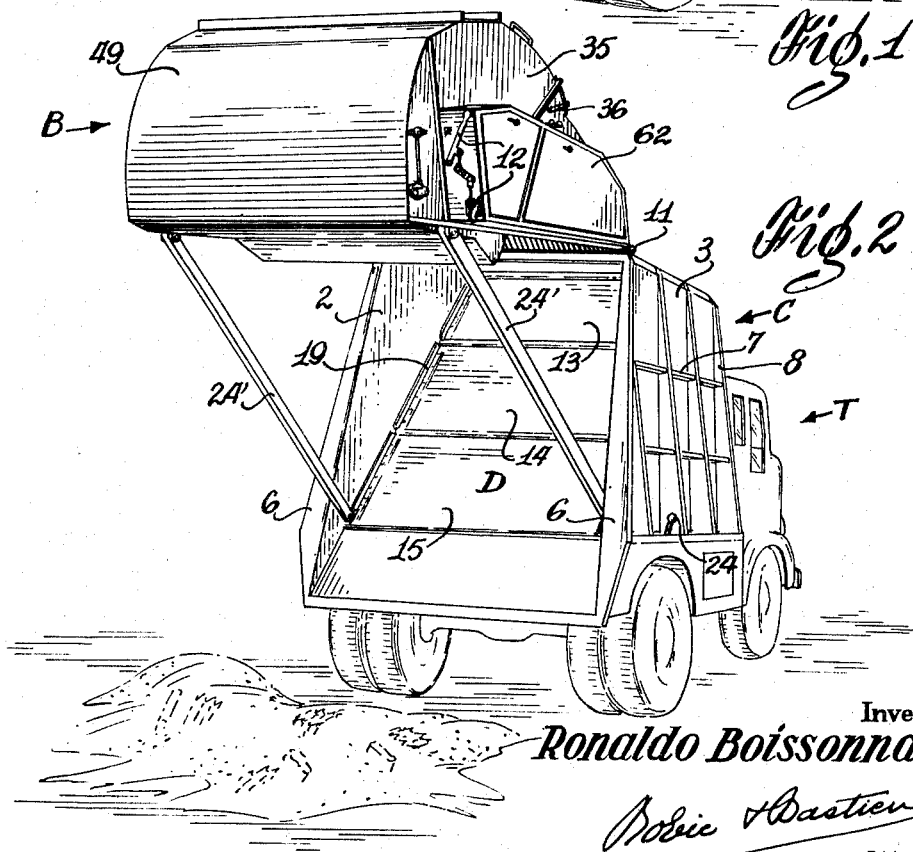
Inventor
Ronaldo Boissonnault

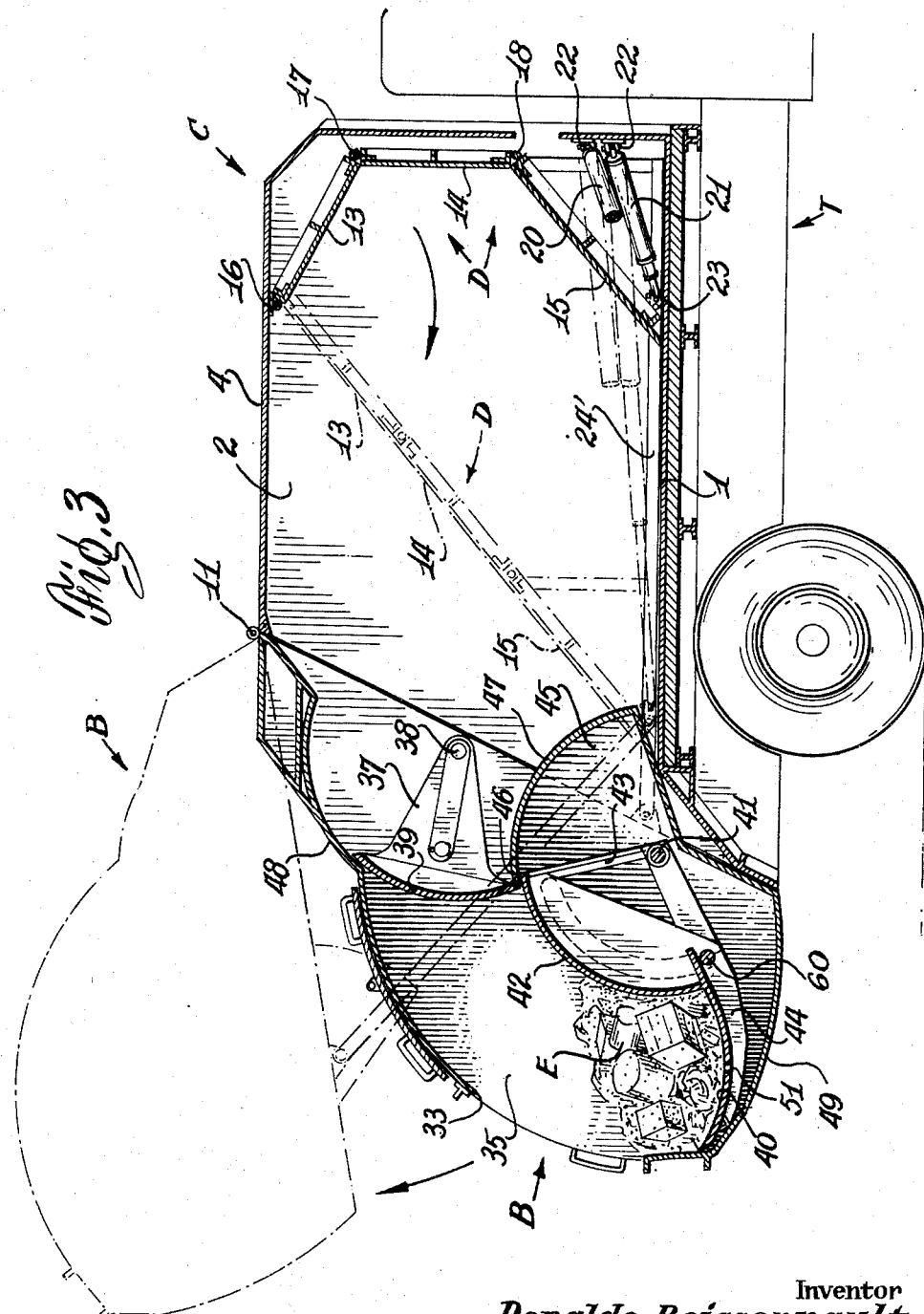

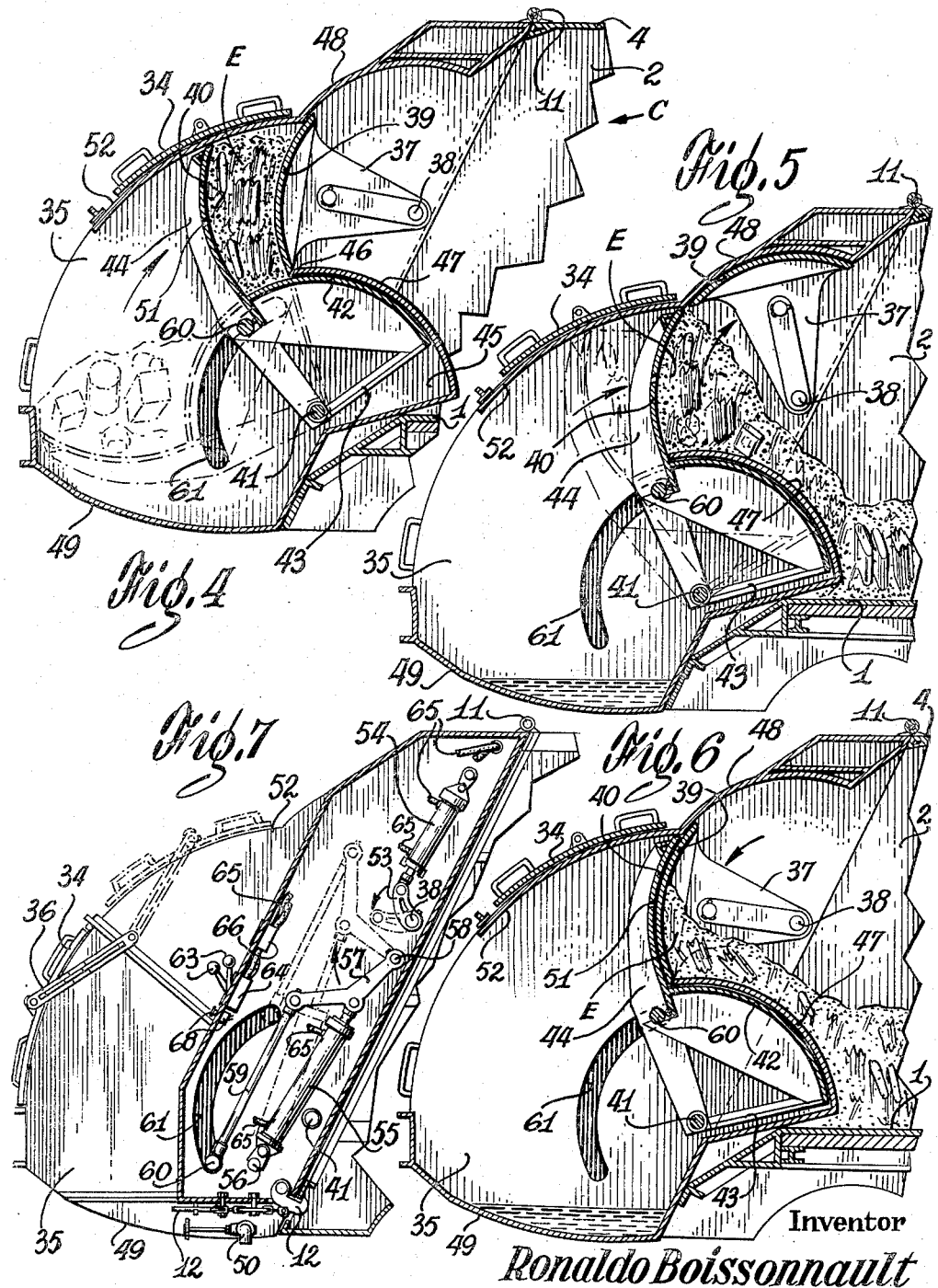

July 24, 1951 R. BOISSONNAULT 2,561,608
LOAD COLLECTING REFUSE VEHICLE AND PACKING DEVICE THEREFOR
Filed March 24, 1950 4 Sheets-Sheet 4
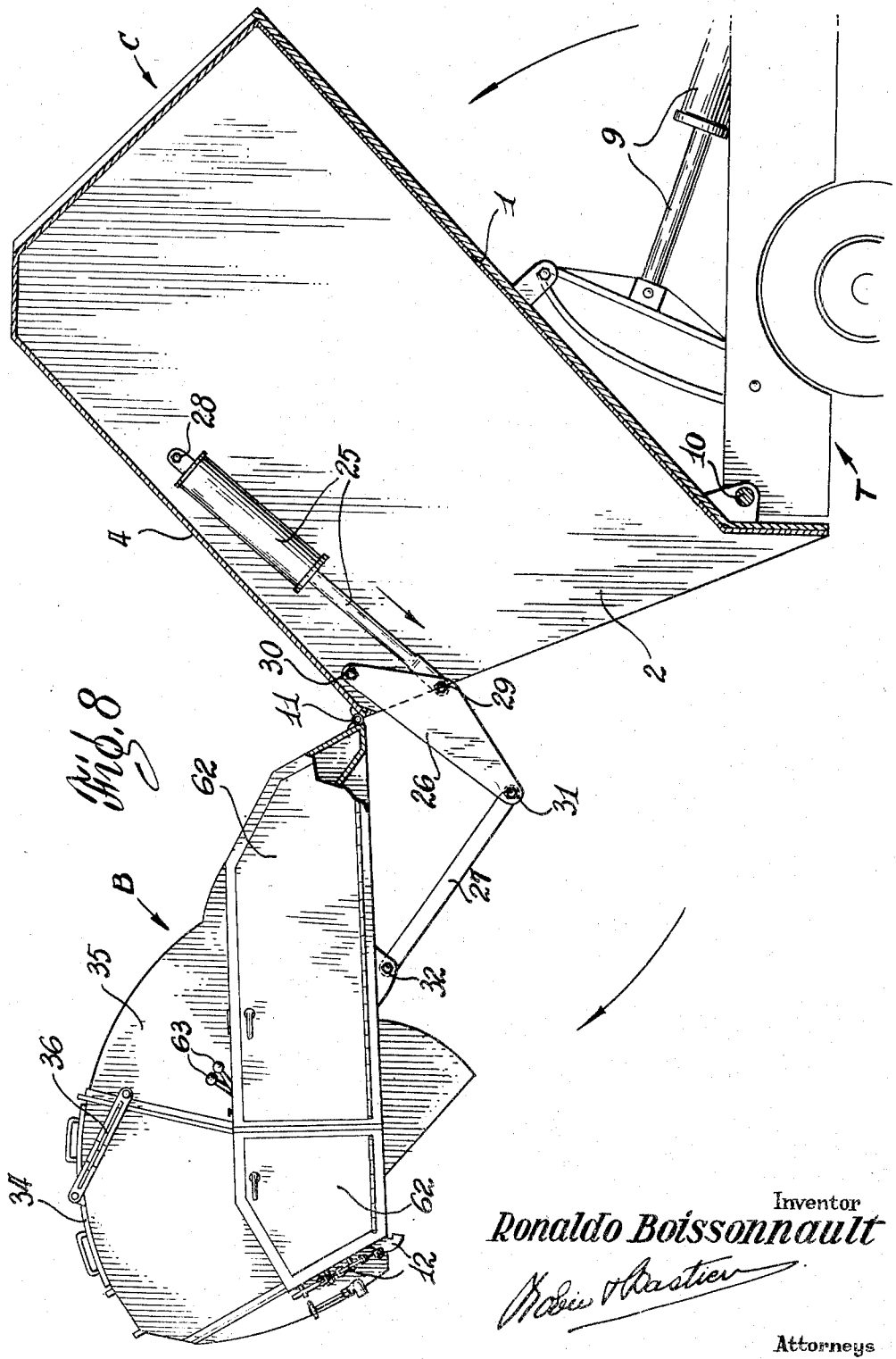
Inventor
Ronaldo Boissonnault
Attorneys Patented July 24, 1951

2,561,608

UNITED STATES PATENT OFFICE 2,561,608

LOAD COLLECTING REFUSE VEHICLE AND PACKING DEVICE THEREFOR

Ronaldo Boissonnault, Montreal, Quebec, Canada, assignor to Sicard Inc., Montreal, Quebec, Canada Application March 24, 1950, Serial No. 151,782

15 Claims. (Cl. 214—67)

The present invention relates to a load collecting vehicle and more particularly to a refuse collecting and packing device for vehicles.

As is common to many refuse or garbage collectors, the device, according to the present invention, comprises in combination with a closable container, power means for loading the same from a single convenient point and to compact the loaded material inside said container.

The device, according to the present invention, comprises, furthermore, means for crushing the loaded material prior to charging same inside the container or storage compartment.

The device, according to the invention, is more particularly characterized by the fact that the collected material is fed to the storage compartment at a point disposed substantially above the bottom or floor of said compartment, thereby using to a maximum the storage capacity of the same by reducing to a substantial degree the "head" of already loaded material under which the fresh load is fed and compacted.

Accordingly, the main object of the present invention is the provision of means in a device of the character described for lifting a load from a point at a height suitable for charging purposes to another point positioned substantially above the floor of a storage compartment for loading the same.

Another important object of the present invention is the provision in combination with a storage compartment of means for compressing and crushing a load prior to feeding the same into said compartment.

Still another important object according to the present invention is the provision in combination with a storage compartment, of a load collecting and packing device and of means for bodily and forcibly expelling the load in said compartment.

Yet another object according to the present invention is the provision of a load collecting and packing device adapted to receive a series of loads in successive loading operations, said loading operations being effected by means operating in such a manner as to eliminate to a substantial degree the clouds of dust usually caused by such charging and loading operations.

Yet another object of the present invention resides in the provision of means for collecting liquids expelled during the crushing operation in a load collecting and packing device of the character above mentioned.

Still another important object according to the invention is the provision of power operated means in a load collecting and packing device, to actuate loading means in a loading and pressing phase, said power operated means adapted to exert an increased pressure during said pressing phase.

The foregoing, another important object according to the present invention, will become more apparent during the following disclosure and by referring to the drawings in which:

Figure 1 is a perspective view of the load collector according to the present invention;

Figure 2 is a perspective view of the same shown in load expelling position;

Figure 3 is a longitudinal section of the same;

Figure 4 is a longitudinal fractional section of the rear portion of the device according to the invention shown in load crushing position;

Figure 5 is a view similar to that of Figure 4 showing the device in storage compartment loading position;

Figure 6 is a view similar to that of Figure 5 showing the successive operation;

Figure 7 is a longitudinal fractional section of the rear portion of the device, according to the present invention, showing the actuating mechanism on one side of the same, and Figure 8 is a part elevation and part section of the loading device according to the present invention in conjunction with another type of storage compartment.

Referring now more particularly to the drawings in which like reference characters indicate like elements throughout, the letter T indicates a truck on which is mounted the storage compartment C, closable by means of the back casing B, the latter carrying the load collecting and packing device according to the invention.

The storage compartment proper is an enclosure having a floor 1, sides 2 and 3, a top 4 and a partial front end panel 5. The mouth, or rear end, of the enclosure is open, and the edge thereof is inclined and formed with a reinforcing contact flange 6, as shown clearly in Figure 2. For purposes of rigidity, side stiffening ribs 7 and braces 8 are provided on the outer walls of the enclosure.

The storage compartment C may either be securely mounted on the truck T shown in Figure 3, or else pivoted for dumping purposes as shown in Figure 8. In the latter case suitable actuating means such as the hydraulic cylinder and piston unit 9 are used to pivot the compartment C about the hinge 10.

The back casing B is hinged at 11 along its upper edge to the back of the storage compartment C and is adapted to completely close the mouth of said compartment. It will be noted that the compartment and casing meet together along a line inclined with respect to the vertical when the storage compartment C is in horizontal position; the weight of the casing, therefore, tends to keep the same in contact with the compartment at all times, said casing being additionally held in place by a catch lever assembly 12 as shown in Figure 7, said catch lever being pivoted on the casing and engaging the bottom flange of the compartment.

When the back casing B is hingedly attached to a storage compartment of the non-dumping type as in Figure 3, the load collector, according to the invention, is provided with load expelling means shown in Figure 2 and also in Figure 3. Said means consists essentially of deformable inside partition generally indicated by the reference letter D. Said partition is a composite affair comprised of three panels 13, 14 and 15 which are adapted to occupy an out-of-the-way position as shown in Figure 3, and a load expelling position as shown in Figure 2. The upper panel 13 is hinged to the top 4 of the storage compartment at 16 and in turn hinged to the adjacent panel 14 at 17. This last panel 14 is similarly hinged at 18 to the lower panel 15. Each of said panels is formed of a suitable metallic plate braced at the back by means of suitable braces and ribs and are provided on the side with a scraper blade 19 adjustably secured to the outer edge of each panel.

The deformable partition D is moved from an out-of-the-way position into a load expelling position and vice versa by means of two crossed telescopic cylinder and piston hydraulic units 20 and 21, hinged at one end to the storage compartment C at 22 and at the other end at 23 to the lower edge of the lower panel 15. A control handle 24 positioned on the side of the storage compartment will be used to actuate the hydraulic units 20 and 21.

As clearly shown in Figure 2 the back casing B is provided with a pair of push bars 24', pivoted at one end to said casing and pivotally connected at the other end at 23 to the hydraulic units 20 and 21, being actuated thereby. Thus, it is clearly seen that the raising of the back casing will be effected simultaneously with the load expelling operation.

In the embodiment shown in Figure 8, there is obviously no need for the deformable partition D and it is seen that the back casing B is raised by independent means comprising on both sides of the casing the piston and cylinder unit 25, the bell crank 26 and the push arm 27. The units 25 are pivoted at 28 to the sides 2 and 3 of the compartment C and to the bell cranks 26 at 29. The bell cranks 26 are in turn pivoted to the sides 2 and 3 of the storage compartment at 30 and to the push arms 27 at 31, the latter are pivoted to the back casing B at 32.

It is seen that this arrangement enables the lifting of the back casing B at a substantially wide angle with the mouth of the compartment C in order to provide ample space for the dumping of the latter.

The back casing B is closed on all sides except for a horizonal elongated charging opening 33 at the rear wall and another opening at the top front portion thereof for communication with the storage compartment C.

The charging opening 33 is closable by means of a cover 34 hingedly mounted on the side walls 35 of the casing by means of arms 36.

The communication between the transfer passage defined by the casing and storage compartment C is closable by means of a trap door 37 horizontally pivoted at 38 to the casing sides 35, said trap door 37 having preferably a cylindrical face 39 facing said transfer passage.

A curved loading panel 40 is horizontally pivoted at 41 to the side walls 35 for arcuate movement within the transfer passage of the casing and is provided with a dependent upwardly extending cylindrical plate 42 rigidly secured to said panel 40 and to arms 43 themselves attached to the pivot point 41 of the supporting arms 44 of said loading panel.

The loading panel 40 is adapted to take a lower charging position as shown in Figure 3, extending adjacent the bottom of the back casing B, and to describe a movement as shown in Figure 4 to compress and crush the loaded material E against the cylindrical face 39 of the trap door 37 which is then in closed position. During this arcuate movement, the cylindrical plate 42 will engage the sector shaped space 45 at the lower front portion of the casing, being scraped by the leading edge of 46 of the curved wall 47 defining said space 45.

After the crushing operation, the trap door 37 will be raised as shown in Figure 5 and the loading panel 40 will complete its arcuate movement to feed the storage compartment C with its load of material E.

It will be noted that in its opening movement, the trap door 37 is scraped free of loaded material by means of the cylindrical portion 48 of the wall of the casing.

It should be also noted that the curvature of the face 39 of the trap door is substantially the same as the curvature of the loading panel 40 such that upon the return closing movement of the trap door 37 as shown in Figure 6, the same will scrape and clean said panel 40.

This cleaning action of the panel 40 is further facilitated by the fact that the loaded material E tends to leave said panel due to the force of gravity because the latter is then in substantially vertical position as clearly shown in Figures 5 and 6. The loading panel 40 is then returned to its initial charging position shown in Figure 3.

The bottom 49 of the casing C is preferably curved and made leak-proof, forming a trough to collect the liquids expelled during the crushing operation. The bottom 49 is provided with a valve 50 for discharging said liquids during the load expelling operation. The loading panel 40 is also bored with holes 51 to facilitate the removal of said liquids from the crushed loaded material E.

The cover 34 is preferably closed during the loading and crushing operation in order to prevent any spilling of the load, said cover and the rear portion 52 of the wall of the casing C having preferably the same curvature as the arc described by the outer edge of the loading panel 40 during its arcuate movement.

It should be noted that escape of dust clouds is largely prevented during the charging operation of the loading device because such dust clouds will tend to rise and be trapped inside the top portion of the casing defined by the trap door 37 and the portion 52 and sides 35 of the casing.

The trap door 37 and loading panel 40 are preferably actuated by hydraulic power means positioned on both sides of the back casing C and illustrated in Figure 7.

The pivot 38 of the trap door 37 is keyed to a lever 53, itself pivoted to the piston of a hydraulic piston and cylinder unit 54, the latter pivotally secured to the side wall 35 of the casing.

Another piston and cylinder unit 55 is pivotally secured to the side wall 35 at 56 and has its piston rod pivotally connected to the medial portion of a bell crank arm 57 which is pivoted at one end on the side wall 35 at 58. The outer free end of said bell crank 57 is pivotally linked by means of a connecting rod 59 to the stud 60 projecting from the middle portion of the arm 44.

Thus it will be seen that the initial phase of upward movement of the loading panel 40 will be rapidly effected while the succeeding crushing phase of said upward movement will be accomplished at a slower rate but with an increased strength, because then the line of action of the piston rod of the hydraulic unit 55 will be substantially the same as that of the connecting rod 59. This is clearly shown in dotted lines in Figure 7.

The hydraulic units 54 and 55 and associated actuating mechanism for the trap door 37 and loading panel 40 are preferably positioned in a compartment separated from the back casing B at both sides thereof, the stud 60 of the loading panel extending through and movable in an arcuate slot 61 made through the sides 35 of said back casing B.

The above mentioned side compartments are provided with doors 62 for easy access to the actuating mechanism for adjustment and repairs.

The units 54 and 55 are actuated by a suitable source of fluid under pressure and are controlled by means of hand levers 63 actuating a valve 64 which is connected to the units and to the source of pressure fluid by the hydraulic lines 65.

A pressure gauge 66 indicates the pressure in the hydraulic system and serves as an identification of the position of the actuated elements when the maximum pressure is reached.

The handle levers 63 and pressure gauge 66 are conveniently positioned at the rear of the load collector together with a suitable knob 67 which is a gas throttle for controlling the engine driving the means for providing the pressure fluid.

Furthermore a suitable button 68 may be provided for ringing a bell in the front cab of the truck in order to warn the driver of the operations being carried on at the back of the load collector.

From the foregoing description, it should be evident that the present invention is an advance in the art of refuse or garbage collection in that means are provided to increase the effective storage capacity of the load collector and to eliminate to a considerable degree the dust usually caused during these operations.

It should be also appreciated that the back casing B containing the loading device according to the present invention may be easily manufactured as an attachment for standard truck storage compartments preferably of the dumping type.

While preferred embodiments according to the present invention have been illustrated and described, it is understood that various modifications may be resorted to without departing from the spirit and scope of the appended claims.

Having thus described my invention, I claim:

1. In means of the character described, as an attachment for a storage compartment, a casing having at its top portion a communication passage with said storage compartment, an arcuately movable loading panel pivoted at the bottom front portion of said casing and having a lower position substantially horizontal to receive a load of material and a top substantially vertical position above its pivot, an integral curved plate member extending at an angle from the inner portion of said loading panel whereby the load received by the latter is restrained by said curved plate member, a trap door pivotally mounted for arcuate movement in said passage, and means for selectively actuating said panel and door, whereby the door may be actuated to close the passage for compressing thereagainst materials carried by the panel prior to being loaded into the storage compartment.

2. In a load collector, a storage compartment having a bottom, a charging casing having a passage communicating with said compartment at a level substantially above said bottom, a trap door adapted to close said passage and positioned above said bottom, a loading panel pivoted to said casing below said trap door, and arcuately movable in the charging casing from a substantially horizontal lower load receiving position to a substantially vertical top position at the level of said trap door, an integral curved plate member extending at an angle from the inner portion of said loading panel whereby the load received by the latter is restrained by said curved member, said loading panel so constructed and arranged as to crush said load against said trap door and to discharge same into said storage compartment through said communicating passage, and means for selectively actuating the panel and door, including a source of motive power therefor.

3. A garbage collector comprising a wheeled compartment open at one end to form a mouth, a hinged back casing covering said mouth, said casing having an opening at the back thereof and a communication with said compartment at the top front portion thereof, a swinging loading panel mounted for arcuate movement within said casing, said panel having a lower substantially horizontal load receiving position below said opening, an integral curved plate member extending at an angle from the inner portion of said loading panel whereby the load received by the latter is restrained by said curved member, a trap door movable to close the communication between said casing and compartment, whereby said panel may compress thereagainst crushable components of the load supported and raised by said panel, means for selectively actuating the panel and door and means for expelling the material loaded in the compartment and raising the hinged back casing to uncover the compartment mouth.

4. A garbage collector as claimed in claim 3 wherein said back casing comprises a leakproof bottom to collect liquids expelled from the loaded material.

5. A garbage collector as claimed in claim 4 wherein said material expelling means comprises a deformable sectional partition hinged at one end to the top of the compartment at the closed end thereof and having the free end slidable on the bottom of the compartment, arms pivoted to said free end and engaging the lower end of the back casing, and a pair of crossed extensible members for actuating said free end from a position adjacent to the closed end of the compartment to a position near the lower edge of the open end and also extending the arms outwardly to raise the back casing from a closed to an open position.

6. In means of the character described, as an attachment for a storage compartment open at one end to form a mouth, said compartment pivoted on a supporting frame for dumping the same, a hinged back casing covering said mouth, said casing having an opening at the back thereof and a communication with said compartment at the top front portion thereof, a swinging panel mounted for arcuate movement within said casing, an integral cylindrical plate member extending at an angle from the inner portion of said swinging panel whereby the load received by the latter is restrained by said cylindrical member, said panel having a lower substantially horizontal load receiving position below said opening, a trap door movable to close the communication between said casing and compartment, whereby said panel may compress thereagainst crushable components of the load supported and raised by said panel, means for selectively actuating the panel and door and means for raising the hinged back casing to uncover said compartment.

7. In means as claimed in claim 6, said back casing comprising a leakproof bottom to collect liquids expelled from the loaded material.

8. In means as claimed in claim 7, said back casing raising means comprising arms pivotally attached to said casing and to members pivotally connected to the compartment sides and actuated by power operated extensible members.

9. In means of the character described, as an attachment for a wheeled compartment open at one end to form a mouth, a hinged back casing covering said mouth, said casing having an opening at the back thereof and a communication with said compartment at the top front portion thereof, a trap door having an arcuate outer face and swingingly pivoted to said casing and movable to close said communication, a loading panel pivoted below said trap door at the bottom front portion of said casing, an integral cylindrical plate member extending at an angle from the inner portion of said loading panel whereby the load received by the latter is restrained by said cylindrical member, said panel having a lower substantially horizontal load receiving position below said opening and a top substantially vertical load crushing position above its pivot, said panel being arcuate to cooperate with the arcuate outer face of said trap door, and means for selectively actuating the panel and door.

10. In means as claimed in claim 9, a portion of the rear wall of said casing positioned adjacent the outer face of said trap door so constructed and arranged as to remove material sticking on said face.

11. In means as claimed in claim 10, a portion of the front wall of said casing positioned adjacent said cylindrical plate member so constructed and arranged as to remove material sticking on said plate.

12. In means as claimed in claim 11, said back casing comprising a leakproof bottom to collect liquids expelled from the loaded material and a valve for draining said bottom.

13. In means as claimed in claim 12 further comprising raising means for the hinged back casing to uncover the compartment mouth.

14. In means as claimed in claim 13, said raising means comprising arms pivotally connected to the sides of said casing and power operated extensible members to extend said arms outwardly to raise the back casing from a closed to an open position.

15. In means as claimed in claim 14, loaded material expelling means for said compartment comprising a deformable sectional partition hinged at one end to the top of the compartment at the closed end thereof and having the free end slidable on the bottom of the same, said arms pivoted to said free end, said extensible members actuating said free end from a position adjacent the closed end of the compartment to a position near the lower edge of the open end.

RONALDO BOISSONNAULT.

REFERENCES CITED

The following references are of record in the file of this patent:

UNITED STATES PATENTS

| Number | Name | Date |
| --- | --- | --- |
| 2,151,887 | Barrett | Mar. 28, 1939 |
| 2,212,058 | Wood | Aug. 20, 1940 |
| 2,430,973 | Boissonnault | Nov. 18, 1947 |
| 2,496,192 | Baldt | Jan. 31, 1950 |
| 2,508,877 | Walker et al. | May 23, 1950 |

FOREIGN PATENTS

| Number | Country | Date |
| --- | --- | --- |
| 628,189 | Germany | Mar. 30, 1936 |